United States Patent
Bischof et al.

[11] Patent Number: 5,648,147
[45] Date of Patent: Jul. 15, 1997

[54] OPTICAL DEVICE AND METHOD FOR COATING AN OPTICAL SUBSTRATE

[75] Inventors: Roman Bischof, Sulz, Austria; Markus Hofer, Butschwil; Albert Koller, Azmoos, both of Switzerland; Christian Wohlrab, Feldkirch, Austria

[73] Assignee: Balzers Aktiengesellschaft, Balzers, Liechtenstein

[21] Appl. No.: 401,204

[22] Filed: Mar. 9, 1995

[30] Foreign Application Priority Data

Sep. 1, 1994 [CH] Switzerland ............... 2679/94

[51] Int. Cl.$^6$ ................................. B32B 27/36
[52] U.S. Cl. .............. 428/212; 428/412; 428/426; 428/432; 428/433; 428/435; 428/436; 428/442; 428/913; 359/359; 359/361; 359/580; 359/581; 359/586; 359/587
[58] Field of Search ................... 428/212, 426, 428/428, 432, 433, 435, 436, 442, 412, 913; 359/359, 361, 580, 581, 586, 587; 351/159, 166

[56] References Cited

U.S. PATENT DOCUMENTS

| 4,440,822 | 4/1984 | Gordon | 428/216 |
| 4,611,892 | 9/1986 | Kawashima et al. | 351/159 |
| 4,830,873 | 5/1989 | Benz et al. | 427/35 |
| 4,934,788 | 6/1990 | Southwell | 350/164 |
| 5,154,978 | 10/1992 | Nakayama et al. | 428/469 |
| 5,173,368 | 12/1992 | Belmares | 428/426 |
| 5,217,749 | 6/1993 | Denton et al. | 427/488 |
| 5,234,748 | 8/1993 | Demiryont et al. | 428/216 |
| 5,415,690 | 5/1995 | Watanabe | 106/287.16 |
| 5,457,570 | 10/1995 | Lu et al. | 359/361 |

FOREIGN PATENT DOCUMENTS

| 0521602 | 4/1992 | European Pat. Off. . |
| 1382644 | 9/1972 | France . |
| 2015983 | 2/1979 | United Kingdom . |
| 8301750 | 5/1983 | WIPO . |
| 8501115 | 3/1985 | WIPO . |

Primary Examiner—Patrick Ryan
Assistant Examiner—Elizabeth Evans
Attorney, Agent, or Firm—Notaro & Michalos P.C.

[57] ABSTRACT

Optical device has a carrier substrate with a surface consisting of a plastic material with a predetermined index of refraction and with first mechanical and/or chemical characteristics. The surface is coated and the coating has second mechanical and/or chemical characteristics which are different from the first characteristics. The index of refraction of the coating is different from the predetermined index of refraction of the carrier substrate surface material, varying steplessly through at least a part of the coating, up to the end index of refraction and the surface of the coating.

22 Claims, 4 Drawing Sheets

OPTICAL DEVICE AND METHOD FOR COATING AN OPTICAL SUBSTRATE

BACKGROUND OF THE INVENTION

FIELD OF THE INVENTION

The present invention is generally directed to thin-film coating of carrier substrates for optical devices. More specifically, it is directed to an optical device which comprises a carrier substrate with a surface consisting of a material with a predetermined index of refraction and with a first set of mechanical and/or chemical characteristics, whereby the surface of the carrier substrate is coated, the surface of the coating remote from the surface of the substrate having a second set of mechanical and/or chemical characteristics different from the first set of characteristics.

It is further directed on a method for coating optical substrates by plasmapolymerisation.

DEFINITIONS

Throughout the present description, the expression "process atmosphere" means the composition of the atmosphere wherein plasmapolymerisation occurs.

Throughout the present description, we understand as "process parameter" a physical entity which controls the plasmapolymerisation process, as e.g. total pressure in plasmapolymerisation process area, strains of magnetic field prevailing in that area, RF power applied between plasma generating electrodes in said area.

DESCRIPTION OF THE PRIOR ART

Coated devices at which mechanical and/or chemical characteristics of a substrate surface are altered by providing a coating are commonly known. Under mechanical or chemical characteristics, characteristic behaviour is understood as mechanical wear resistance, chemical wear or corrosion characteristics, adherence characteristics, diffusion characteristics, wetability characteristics etc.

Optical devices are known at which a coating changes the mechanical and/or chemical characteristics of the substrate surface whereon the coating is applied, be it that the coating considered is directly deposited on the surface of the substrate or be it that the coating considered is applied on a further coating, latter directly applied to the surface of the substrate. The body on the surface of which the coating is applied is generally considered as the "substrate" throughout the following description.

Mechanical wear protection hard material coating of optical plastic bodies with lacquer is customary for the production of planar plastic substrates and in the ophthalmics. Thereby lacquers with different indices of refraction are used.

The method for producing mechanical and chemical wear resistant coatings on different substrates by means of plasmapolymerisation has been known for quite a long time, too. Under the term "plasmapolymerisation" one understands generally coating formation from vapor of organic or metal-organic monomers in a plasma discharge. With respect to such coating methods, attention is drawn to R. D. Agostino, "PLASMA DEPOSITION TREATMENT AND ETCHING OF POLYMERS"; Academic Press, 1989, ISBN 0-12-200430-2, and to H. v. Böhning, "PLASMA SCIENCE AND TECHNOLOGY", Cornell University Press, 1982, ISBN 0-8014-1356-7.

From the EP-A-0 177 517 and from the IKV Final Report "Plasmapolymerisation" from K. Telgenbüscher, J. Leiber, May 19, 1993, Institute for Plastic Material Treatment, D-Aachen, methods are known in which by varying specific coating process parameters as power or process atmosphere, as by deferred admission of oxigen, there is reached a good adhesion of the coating, thereby simultaneously reaching a high wear resistancy. Thereby exclusively silicon containing organic compounds are used as metal-containing monomers. By means of the said variations, it is attempted to reach a change of the mechanical characteristics.

For instance, the growth of the coating is controlled so that it starts with relatively soft adhesion improving coating on a substrate which is relatively soft, as well which is realized in a process atmosphere which contains a silicon-containing metal organic compound without admission of oxigen. Afterwards, step by step or continuously, oxigen-flow is increased, whereby the quotient Si/O decreases in the coating which leads to an increase of coating hardness and thereby of mechanical wear resistancy.

If the finishing coating is applied with a high enough oxigen content of the process atmosphere and thick enough, there can be reached satisfying mechanical wear protection of a plastic material substrate.

With respect to the deposition of $TiO_2$ or of $TiO_2$-containing coating by means of plasmapolymerisation, attention is drawn on different basic investigations, so for instance in H. J. Frenck, W. Kulisch et al., Thin Solid Films, 201 (1991) 327– 335; J. P. Barker, P. J. Radcliff et al., Proceedings of 11th International Symposion of Plasma Chemistry, Aug. 22–27 (1993) 1154–1159, ISBN 0-95221-493-8.

Principally, it is further known to use plastic substrates for ophthalmic applications as for lenses and to provide such substrates with a wear protective layer.

One plastic material which is often used for ophthalmic applications is the relatively low-weight plastic material CR-39 which has good optical characteristics. The index of refraction of this plastic material is 1.5.

Customarily, such plastic material bodies are wear resistant coated by means of a coating containing silicon organic material with an index of refraction of approx. 1.5.

Thus, such a substrate coated with such coating inherently leads to an optical device with no stepped index of refraction and, thus, with no disturbing interference pattern and no reduction of transmission. It thus may not attract the attention on the problem of stepped index of refraction to be resolved when such stepped index could in fact occur.

Nevertheless, the application of substrates with higher index of refraction would be most desirable because of the resulting reduced substrate thickness. Application of such higher index substrates is nevertheless known, but thereby the occurrence of interference disturbances is tolerated in view of the reduced thickness achieved.

SUMMARY OF THE INVENTION

It is a predominant disadvantage of the described coated optical devices that by applying the coating, as for instance a wear resistance coating, a stepped characteristic of the index of refraction occurs considered along the carrier substrate and the coating applied thereto. Thus, optical characteristics of a resulting optical device, too, are changed by a coating which, principally, has been applied with the target to change other characteristics than opticals, namely to change mechanical and/or chemical characteristics of the substrate.

It is thus a general object of the present invention to provide an optical device and a method to produce such device, whereby the coating varies exclusively that characteristic wherefore it is applied for, thus for instance exclusively the mechanical or chemical wear resistance characteristics, adherence characteristics, corrosion characteristics, diffusion characteristics or characteristics of wetability.

This is reached by the optical device according to the present invention which comprises a carrier substrate with a surface consisting of a material with a predetermined index of refraction and with first mechanical and/or chemical characteristics, whereby the surface of the carrier substrate is coated and the surface of the coating remote from the surface of the substrate has second mechanical and/or chemical characteristics which are different from the mentioned first characteristics and wherein further the course of index of refraction departing from the predetermined index of refraction of the carrier substrate surface material varies steplessly through at least a part of the coating up to the end index of refraction at the surface of the coating exposed to ambient. The object of providing a method of production of optical devices, which fulfil the above mentioned object, is resolved by a method for coating an optical substrate by plasmapolymerisation which comprises the steps of controlling the index of refraction along the growing coating so as to vary steplessly departing from the index of refraction of the substrate to an intended final index of refraction of the coating at its surface by controlling the composition of the atmosphere of plasmapolymerisation and/or by controlling at least one process parameter for the plasmapolymerisation coating process.

All the objects, advantages and preferred features of the inventive optical device and method for producing such will become evident to the man skilled in the art when reading the description and claims of the present application.

BRIEF DESCRIPTION OF THE DRAWINGS

Thus, the present invention, under all its aspects, will be better understood and objects other than those set forth above will become apparent to the man skilled in the art when consideration is given to the following detailed description thereof. Such description makes reference to the annexed drawings wherein:

FIG. 1 schematically shows a prior art plasmapolymerisation apparatus which is preferably used for the inventive method to produce the inventive optical device. This apparatus accords with the apparatus of the types PPV 100, PPV 500 or PPV 1000 of Balzers AG.

Figure 1:
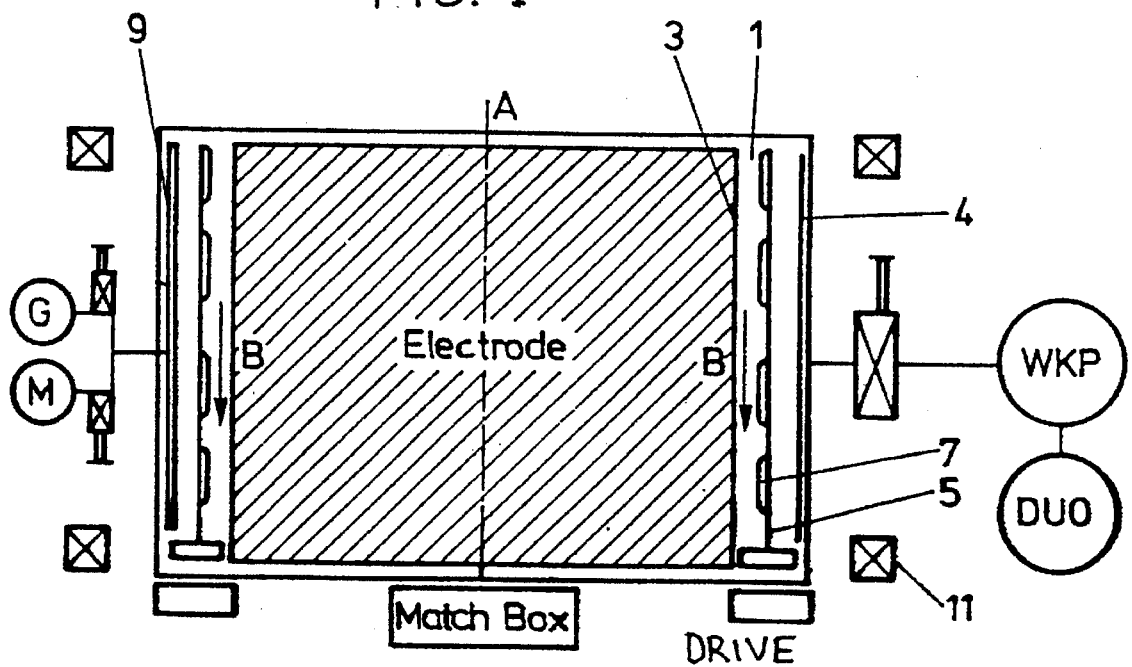
FIG. 1 schematically shows a plasmapolymerisation apparatus which accords with that described in the EP-A-0 550 003 or, accordingly, the U.S. Pat. No. 5,310,607 and which is operated according to the DE-A-39 31 713 which accords with the U.S. Pat. No. 5,227,202. These references form an integral part of the present description as concerns a preferred construction of plasmapolymerisation apparatus as used to perform the present invention and with respect to operation of such apparatus.

The process area 1 has an annular configuration. Its interior wall is, at least to a part, formed by the first electrode arrangement 3, its outer wall by the second electrode arrangement 4. Within the process area 1 an RF-plasma-discharge is generated, electrically fed by an RF-signal of preferably 13.56 MHz. The discharge is thereby homogeneously distributed along the entire annular process area 1. In the middle of the process area 1, there is provided an annular substrate carrier 5 on which substrates 7 are held along their border. The substrate carrier 5 slowly rotates within the annular process area 1. Thereby and as is described in the EP-A-0 550 003, according to the U.S. Pat. No. 5,310,607, and the DE-A-39 31 713, according to the U.S. Pat. No. 5,227,202, there is achieved all around the substrate a simultaneous and at least nearly equal plasmapolymerisation coating with the exception of surface areas at these substrates along which such substrates are held at the substrate carrier 5.

The process atmosphere in the process area 1 is given by feeding gases or gas mixtures through a gas feed arrangement 9 into the process area. Coils 11 generate in the process area 1 a magnetic field B with lines of field substantially parallel with respect to the central axis A of the annular apparatus configuration.

At G, there is schematically shown a gas tank with a controllable outlet, M shows thereby a monomer tank. The process atmosphere is open-loop controlled or negative feedback controlled to a desired composition. Preferably and in a wellknown manner, the process atmosphere is monitored and negative feedback controlled.

In the following Table I, the characteristic data of the apparatus used in the following examples and according to FIG. 1 are shown.

TABLE I

| Type of apparatus | Volume [1] | Capacity of Lenses with φ 60 | RF-Power [W] | Magnetic Field [mT] | Pumping Power [m³/h] | No. of Gas feed |
|---|---|---|---|---|---|---|
| PPV 100 | 20 | 12 | 1250 | 0–17 | 400 | 3 |
| PPV 500 | 70 | 96 | 2500 | 0–7 | 2000 | 3 |
| PPV 1000 | 215 | 192 | 5000 | 0–17 | 4000 | 3 |

In Table II, seven settings of process atmospheres are shown, together with process parameters at such apparatus and the resulting index of refraction of the coating resulting plasmapolymerisation, realized at an apparatus PPV 100. These different settings and the resulting indices of refraction show principally that by varying the process atmosphere and/or process parameters accurate and small amount variations of the index of refraction at the deposited coating may be realized.

TABLE II

| No. | $n_D$ | Pressure [$10^{-2}$ mbar] | Magnetic field [mT] | RF-Power [mw/cm2]* | RG-Flow [sccm/ cm2 × $10^{-3}$]* | M1-Flow [sccm/ cm2 × $10^{-3}$]* | M2-Flow [sccm/ cm2 × $10^{-3}$]* | M3-Flow [sccm/ cm2 × $10^{-3}$]* |
|---|---|---|---|---|---|---|---|---|
| 1 | 1.50 | 1.2 | 4.0–5.0 | 80  | —   | 4.3 | —    | —   |
| 2 | 1.56 | 1.9 | 3.5–4.5 | 80  | —   | 3.7 | 5.4  | —   |
| 3 | 1.60 | 1.5 | 3.5–4.5 | 80  | —   | 3.2 | 10.6 | —   |
| 4 | 1.65 | 1.4 | ca. 2.0 | 95  | —   | 1.3 | —    | 1.9 |
| 5 | 1.67 | 1.4 | ca. 1.4 | 95  | —   | 1.3 | —    | 1.9 |
| 6 | 1.72 | 1.3 | ca. 2.0 | 160 | —   | —   | —    | 1.9 |
| 7 | 1.80 | 1.4 | ca. 1.4 | 130 | 5.8 | —   | —    | 1.9 |

*Power and flow are related to the respective electrode surface.

Thereby:

$M_1$ stands for dimethyldiethoxysilane, $M_2$ stands for toluene (Toluol), $M_3$ stands for titanium(IV)-isopropylate and RG stands for $O_2$.

These symbols $M_1$, $M_2$, $M_3$, RG are used throughout the further description in the sense given above. Nevertheless, and as will be also described below, other gases or monomers may be used to perform the inventive method and to produce the inventive optical devices.

Preferably monomers are used which have a sufficient stability and a relatively high vapor pressure and further have low toxicity, which are common and which are thus relatively inexpensive. Thus, principally and for performing the inventive method, the following monomers may be used:

purely organic base substances: alkane, alkene, alkine, alcohols, amines, ketones, cyclical or anti-cyclical compounds and aromatic circular compounds, aliphatic, alicylic or aromatic compounds;

metalorganic compounds, thereby especially silicon and titanium containing compounds with the following structures:

$TiR_x(OR)_y$ with $0 \leq x$, $y \leq 4$, $x+y=4$, as e.g. $TiR_4$, $Ti(OR)_4$, $R_{x1}(OR)_{y1}SiOSiR_{x2}(OR)_{y2}$ with $0 x_1; Y_1 3; x_1+Y_1=3$;

$0 \leq x_2; Y_2 \leq 3; x_1+Y_1=3$;

as e.g. $R_3SiOSiR_3$, $(RO)_3SiOSi(OR)_3$, whereby R stands for an organic group.

One or more than one organic group R may be replaced by H-atoms and different organic groups R may be linked to a metal-atom and/or one or more than one H-atom may be linked to a metal-atom.

For instance, controlling the coating process according to the process control steps as defined under the numbers 1 to 7 of Table II results in the respective indices of refraction $n_D$, as listed in that table, so that one can select respective process control steps and/or interpolate between such steps so as to control a desired profile of index of refraction during deposition of the coating.

As has been described, the inventive method is not limited to the use of the monomers $M_1$, $M_2$, $M_3$ or of the reactive gas RG, as shown in Table II and as defined, but other substances may be used so that each desired value of index of refraction between 1.4 and 2.2, but especially between 1.45 and 2, may be realized for the coating. If desired, beside of the monomers in gaseous state, one or more than one gas, as especially oxygen or nitrogen, may be fed to the process atmosphere.

DEFINITION OF TESTS WHICH WERE PERFORMED AT THE COATED PLASTIC MATERIAL BODIES WHICH WILL BE DESCRIBED IN THE FOLLOWING.

1. Optical Characteristics 1.1 Transmission

The transmission was tested with test light with an optical wave-length $\lambda=550$ nm.

Thereby the following is to be considered:

The minimum reflection of a homogeneous body for light impinging at 90° and at ambient air is given by the step of index of refraction $n_D$ at the body's surface.

If a body is coated and has at the interface between substrate and coating a step of index of refraction, then transmission is reduced because the resulting reflection is higher than the reflection defined by the characteristics at the coating/ambient interface.

This means for the present invention:

The lower that steps of index of refraction are considered along the test light beam path through coating and substrate, the closer will be the measured transmission to that transmission which is merely defined by the index of refraction at the coating ambient interface.

1.2 Newton Ring Pattern

If the coated body has a stepped course of index of refraction with said step especially at the interface coating/ substrate, a so-called Newton ring pattern will appear if such a body is examined by eye. Such pat. tern is caused by interference phenomena.

2. Test of Mechanical Resistancy

The rubber-gum test according to DIN 58196-4 or ISO 9211-4, MIL 657 has been performed.

EXAMPLE 1

(Prior Art)

With an apparatus PPV 1000 a CR-39 plastic material substrate was coated with a wear protective coating. The index of refraction of CR-39 is 1.5. In Table III, the coating parameters and the time courses of their controls are listed.

TABLE III

| Coating Module/Type | Duration | Pressure | Magnetic-Field/Ramp Duration | RF-Power P/Ramp Duration | RG flow/ Ramp Duration | M1 Flow/ Ramp Duration |
|---|---|---|---|---|---|---|
| 1 Gas stabil. | 90 | 0.8 | 4.0–5.0 | — | — | 4.2/0 |
| 2 Adherenc. | 600 | 1.2 | 4.0–3.0 | 80/0 | — | 8.0/600 |
| 3 Hard | 1200 | 2.0 | 4.0–5.0 | 106/300 | 3.2/300 | 8.0/0 |
| 4 Hard | 1200 | 2.4 | 4.0–5.0 | 133/300 | 6.4/300 | 8.0/0 |
| 5 Hard | 1200 | 2.7 | 4.0–5.0 | 160/300 | 12.2/300 | 8.0/0 |

Thereby the following dimensions are used, equally to the examples which will be yet described later:
Time duration: sec
Pressure: $10^{-2}$ mbar
Magnetic Field: mT
RF-Power P: mW/cm$^2$-electrode surface
Flow: $10^{-3}$ sccm/cm$^2$-electrode surface
Ramp rise duration: sec The optical tests at the coated CR-39 substrates showed that these coated substrates have a high transmission of 92%. No Newton ring pattern could be recognized. No damage was caused by the rubber-gum test at the coated substrate, in contrary to a significant damage at the uncoated CR-39 substrates by rubber-gum traces.

It is known that the index of refraction of silicon organic wear protecting coatings is approx. 1.5, thus equal to that of the CR-39 plastic material.

Thus, the coating/ambient air interface would lead to a reflection of 8%, and the measured transmission of 92% clearly shows the continuously constant course of index of refraction at a value of 1.5 through the substrate and the wear protective coating. This accords with the explanations given above with respect to silicon organic wear protective coated CR-39 plastic material substrates.

Higher refractive index plastic material substrates are commonly used, as of the type described in the following, so, for instance, with an index of refraction $n_D > 1.6$, because optical lenses of such material will be thinner and lighter. These advantages could only be exploited up to now together with toleration of the disadvantages of reduced transmission and of interference effects, which both are due to the commonly encountered index step at the interface substrate/coating.

Because such higher refractive index substrates are additionally softer than lower index substrates, a wear protective coating for such higher index substrate is a necessity, so e.g. for the higher refractive index substrates which will be described, namely of HI-plastic material.

Figure 2:
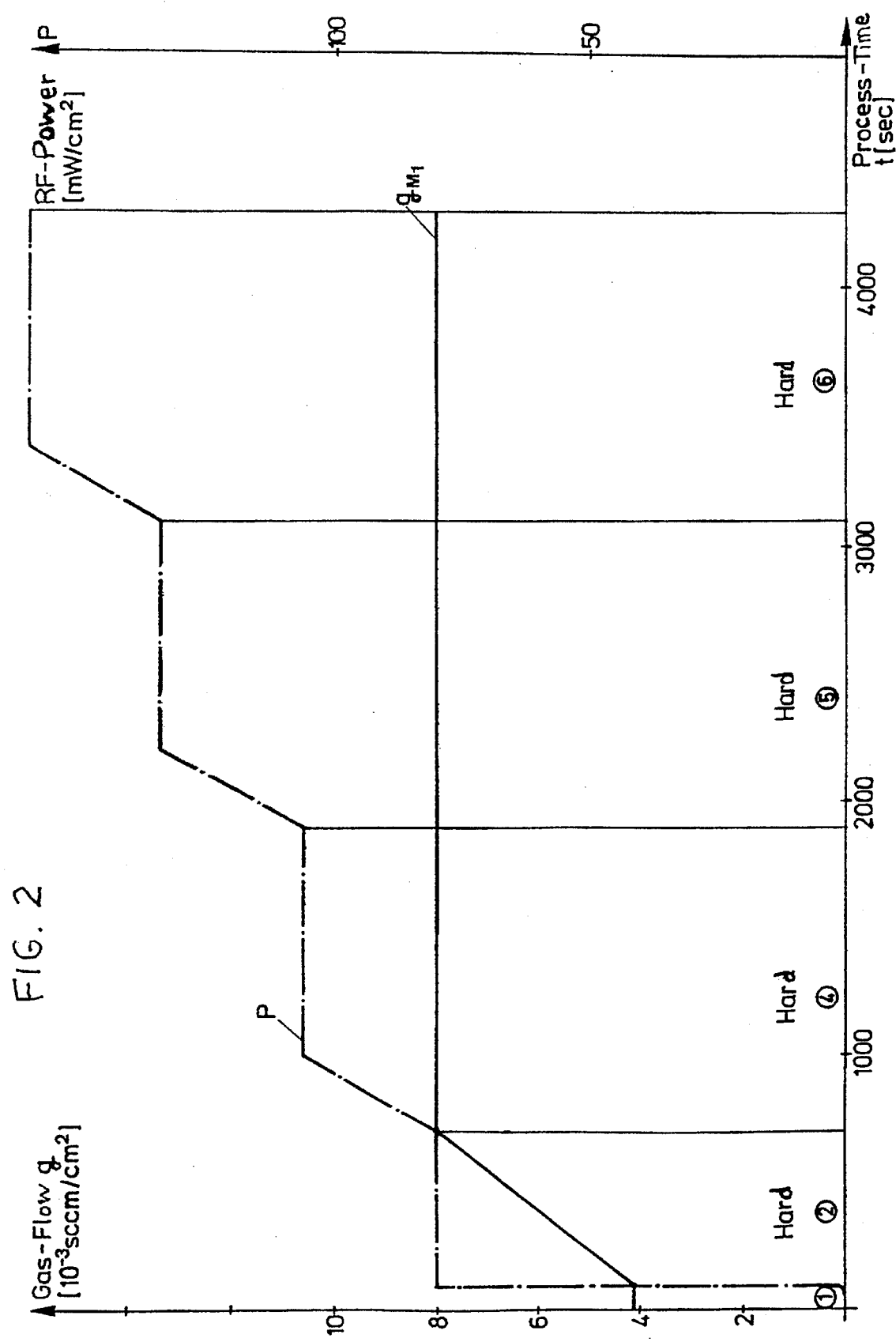
FIG. 2 shows, with respect to time, qualitatively the control of process atmosphere for a prior art resistant coating of plastic material lenses with an index of refraction $n_D=1.5$.
Figure 3:
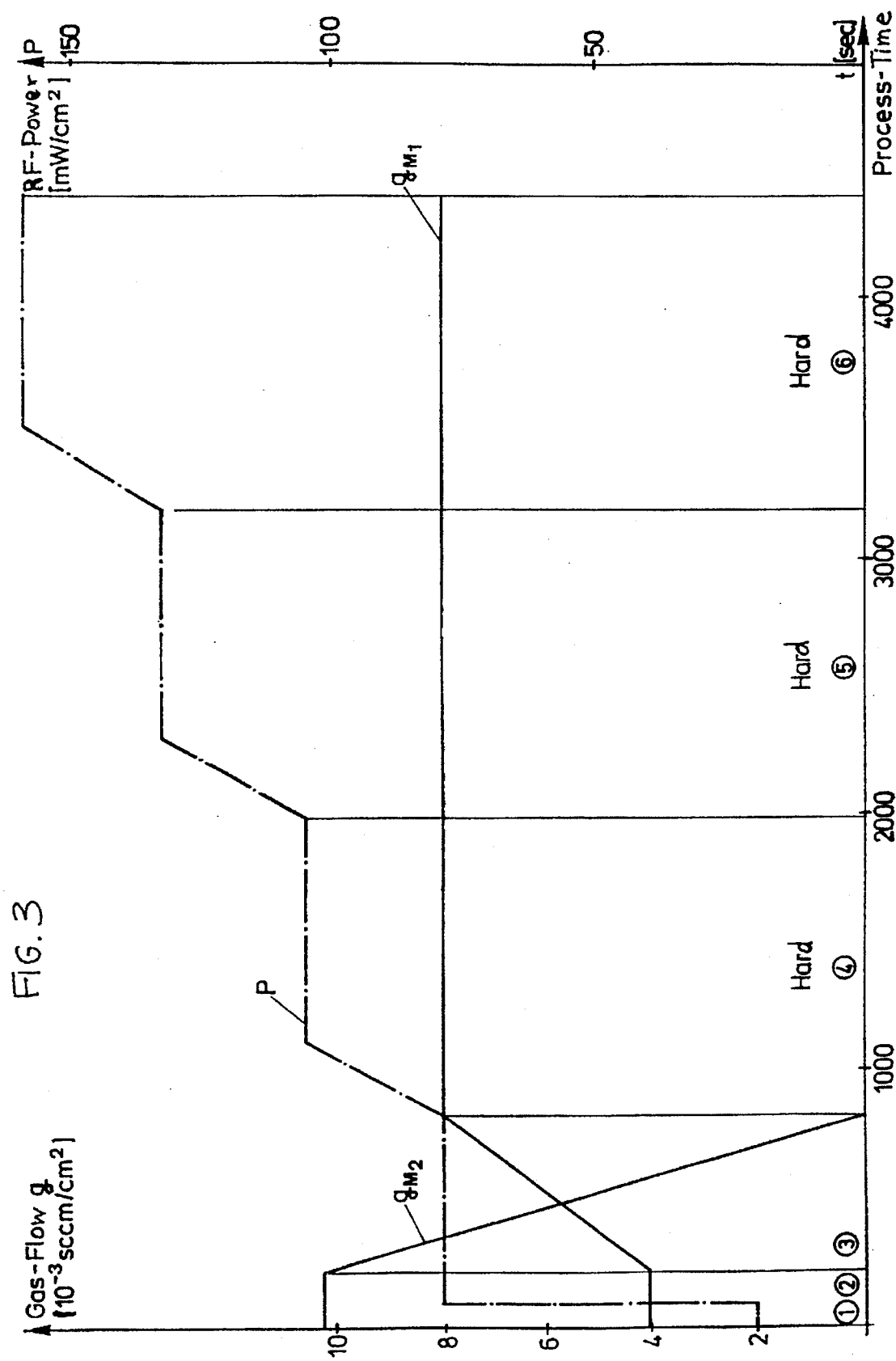
FIG. 3 shows, in a representation analogous to that of FIG. 2, a process course according to the present invention for plastic material substrates with $n_D>1.5$.

The time course of the coating process according to Table III for the prior art process and optical device is shown in FIG. 2.

EXAMPLE 2

(Example of Inventive Method and Device)

With a PPV 1000 plasmapolymerisation apparatus HI-plastic material substrates with a higher index of refraction, namely of $n_D = 1.6$, were coated with the wear protective coating according to example 1. The coating parameters are listed in Table IV.

TABLE IV

| Coating Module | | Dura-tion | Pres-sure | Magnetic Field/ Ramp- Duration | RF- Power P/Ramp- Duration | RG- Flow/ Ramp- Duration | $M_1$- Flow/ Ramp- Duration | $M_2$- Flow/ Ramp- Duration |
|---|---|---|---|---|---|---|---|---|
| No. | Type | | | | | | | |
| 1 | stab. | 90 | 0.8 | 4.0–5.0 | — | — | 4.2 | 10.6 |
| 2 | adher. | 120 | 1.2 | 4.0–5.0 | 80 | — | 4.2 | 10.6 |
| 3 | I.-Fit. | 600 | 1.5 | 4.0–5.0 | 80 | — | 6.0/600 | 0/600 |
| 4 | Hard | 1200 | 2.0 | 4.0–5.0 | 106/300 | 3.2/300 | 8.0 | — |
| 5 | Hard | 1200 | 2.4 | 4.0–5.0 | 133/300 | 6.4/300 | 8.0 | — |
| 6 | Hard | 1200 | 2.7 | 4.0–5.0 | 160/300 | 12.2/300 | 8.0 | — |

Figure 4:
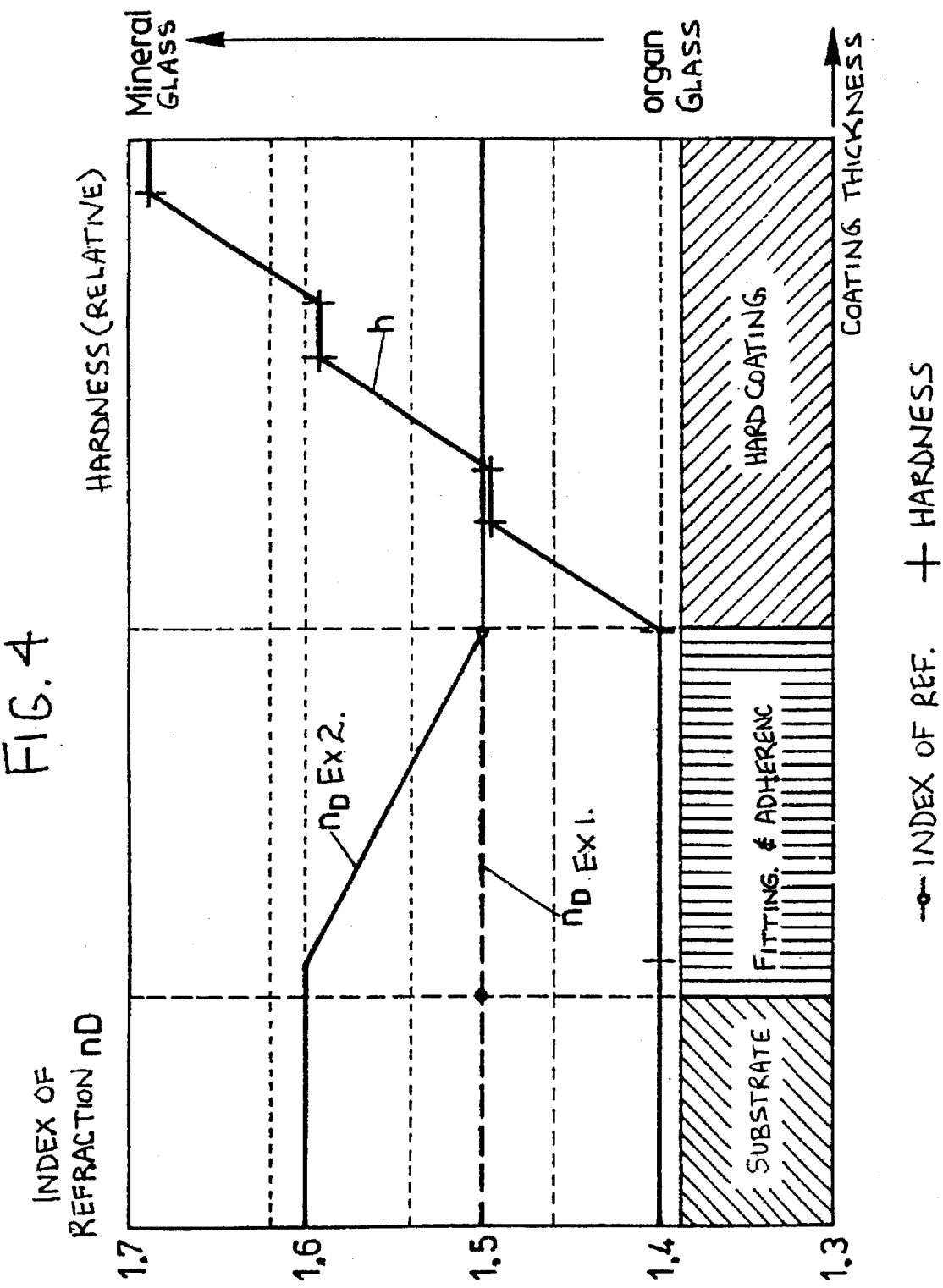
FIG. 4 shows along the thickness dimension of the coating at an inventively coated optical device realized preferably according to the inventive method the course of the index of refraction $n_D$ and of the relative hardness. The optical device was realized by process control according to the examples 2 or 3 given below.

In FIG. 4, there is shown, with respect to qualitative coating thickness, the course of the index of refraction of optical devices according to example 1 (prior art) and 2 (invention) and of the relative hardness for these examples. For reasons of clarity, the adhesion- and index-fitting coating areas are shown much too thick compared with the hard and wear protective coating areas and compared with the coating thickness in practice.

As shown in FIG. 2 and Table III, in example 1, there is no index-fitting coating area. The index of refraction of example 1, shown in dashed line in FIG. 4, is 1.5 departing from the substrate and through the wear protective coating.

By means of the index-fitting coating area of example 2, the index of the HI-substrate of 1.6 is continuously fitted to the index of refraction of the wear protective coating which latter is 1.5.

The measured transmission was again 92% which shows that in spite of the difference of index of refraction between substrate and wear protective coating, there occurs no reflection at the substrate/coating interface which would lead to a measured overall transmission smaller than 92%, which latter value accords with the coating/ambient interface reflection of the wear protective coating with $n_D = 1.5$. Further, eye-inspection of the coated substrate showed no Newton ring pattern. The transmission of said optical device is at maximum 0.5% different from transmission defined by said surface of said coating in surrounding air and by said end index of refraction, at light with a wavelength of 550 nm.

Again, the coated substrates were subjected to the mechanical tests mentioned above:

No rubber-gum traces appeared on the coating in opposition to considerable harm which was done by the rubber-gum test on the HI-plastic material substrate surface.

EXAMPLE 3

Bodies for optical lenses made of HI-plastic material with an index of refraction $n_D$=1.67 were coated equally as has been described in connection with example 2, with the exception that instead of $M_2$ there was applied the monomer $M_3$ during index-fitting.

Again, the wear protective coated lenses were highly transparent, i.e. had a transmission of 92% and an end index of refraction of the wear protective coating of $n_D$=1.5. With respect to Newton ring pattern and mechanical tests, the same results were achieved as have been described in connection with example 2.

Principally, it is essential that for index-fitting between substrate material of higher index of refraction and coating with lower index of refraction the index-fitting along the index-fitting coating module or -area is achieved by simultaneous reduction of the atmosphere-content of that monomer gas which would lead to deposition of a coating material with a higher index of refraction when separately subjected to the defined plasmapolymerisation and to thereby simultaneously increase the content of that monomer gas which would, separately subjected to said plasmapolymerisation, lead to coating material with a lower index of refraction.

EXAMPLE 4

The coated substrate according to the examples 2 or 3 were additionally coated with further coating modules.

Thereby, the ratio of oxygen to dimethyldiethoxysilan ($M_1$) was further increased, and finally the coating process was performed with a ratio "oxygen to dimethyldiethoxysilan" of at least 5, up to infinite. Thereby, on the wear protective coating according to the examples 2 or 3, an adherence-improving coating was deposited and then an anti-reflex coating was applied in the form of a four-layer $SiO_2$,$TiO_2$-broad-band anti-reflex layer system. The anti-reflex coating showed no peel-off tendency, tested with the well-known "Cross hatch tape test", as well as in the salt-water boiling test.

By the inventive method, a further essential advantage is reached in that different material substrates may be coated by different coating process controls so that finally the coating surfaces for all coated substrates have the same characteristics. Such characteristics may be mechanical, chemical and/or optical. Thus, by the mere fact that different material substrates, after having been coated, will have the same surface characteristics, it becomes possible to afterwards treat all these coated substrates equally.

The described method is especially suited for coating optical plastic material lenses. Thereby, lense bodies or -substrates of different index of refraction may be coated with a wear protective coating so that the index of refraction steplessly varies departing from the respective indices of the substrate materials to a unitary end index at the coating. Thus, in a subsequent coating process, as especially a subsequent anti-reflex coating process, lenses with optically different substrate materials may commonly be anti-reflex treated. Thereby a considerably improved exploitation of production capacity may be reached which even may lead to lowering plant capacity which is important for instance in small batch coating operations.

In opposition to the plasmapolymerisation coating methods known to date, by the inventive application of different monomer gases and of different other gases and by variation of the process atmosphere,. realized by such gases as a function of time, different characteristics, be it mechanical, chemical or optical, may simultaneously be varied along the coating thickness dimension. Especially by the use of titanium monomers it becomes possible to apply wear resistant, highly transparent (low absorption) coatings index-matched to high index of refraction ophthalmic plastic materials.

We claim:

1. Optical device, comprising a carrier substrate consisting of a plastic material with a surface consisting of a material with a predetermined index of refraction and with first mechanical and/or chemical characteristics, said surface of said carrier substrate being coated, the surface of said coating remote from said surface of said substrate having second mechanical and/or chemical characteristics different from said first characteristics, wherein the index of refraction departing from said predetermined index of refraction of said carrier substrate surface material varying steplessly through at least a part of said coating up to the end index of refraction at said surface of said coating.

2. The device of claim 1, wherein said predetermined index of refraction is larger than 1.5.

3. The device of claim 1, wherein the index of refraction of said plastic material substrate is larger than 1.5.

4. The device of claim 3, wherein said coating comprises a wear-resistant hard material coating.

5. The device of claim 1, wherein said coating is a wear-resistant layer, and said plastic material substrate has an index of refraction lager than 1.5.

6. The device of claim 5, wherein the transmission of said optical device is at max. 0.5% different from transmission defined by said surface of said coating in surrounding air and by said end index of refraction, at light with a wavelength of 550 nm.

7. The device of claim 1, wherein said plastic material substrate has an index of refraction larger than 1.5, said coating comprising a wear-resistant hard material coating and said substrate being the body of an optical lens.

8. The optical device of claim 1, wherein said plastic material substrate has an index of refraction larger than 1.5, said coating comprising a wear resistant hard material coating, whereby an anti-reflex coating is applied on said coating.

9. The device of claim 8, wherein an adhesion improving intermediate coating is provided between said wear-resistant coating and said anti-reflex coating.

10. The device of claim 1, wherein said plastic material substrate has an index of refraction larger than 1.5, wherein said coating comprises a wear resistant coating and comprises, at least in an area in which said index of refraction varies from said pre-determined value to said end value, at least one titanium-oxide compound.

11. The device of claim 1, wherein said substrate is equally coated all around with the exception of at least one area at which said substrate was held during a coating process for depositing said coating.

12. The device of claim 1, wherein said plastic material substrate has an index of refraction larger than 1.5, and wherein said end index of refraction of said coating is at least approx. 1.5, said coating comprising a wear resistant hard material coating.

13. The device of claim 1, wherein the index of refraction said plastic material substrate is at least 1.6.

14. The device of claim 13, wherein said coating comprises a wear-resistant hard material coating.

15. The device of claim 1, wherein said coating is a wear-resistant layer, and said plastic material substrate has an index of refraction of at least 1.6.

16. The device of claim 15, wherein the transmission of said optical device is at maximum 0.5% different from transmission defined by said surface of said coating in surrounding air and by said end index of refraction, at light with a wave-length of 550 nm.

17. The device of claim 1, wherein said plastic material substrate has an index of refraction of at least 1.6, said coating comprising a wear-resistant hard material coating and said substrate being the body of an optical lens.

18. The optical device of claim 1, wherein said plastic material substrate has an index of refraction of at least 1.6, said coating comprising a wear resistant hard material coating, whereby an anti-reflex coating is applied on said coating.

19. The device of claim 18, wherein an adhesion improving intermediate coating is provided between said wear-resistant coating and said anti-reflex coating.

20. The device of claim 1, wherein said plastic material substrate has an index of refraction of at least 1.6, wherein said coating comprises a wear resistant coating and comprises, at least in an area in which said index of refraction varies from said predetermined value to said end value, at least one titanium-oxide compound.

21. The device of claim 20, wherein said substrate is equally coated all around with the exception of at least one area at which said substrate was held during a coating process for depositing said coating.

22. The device of claim 1, wherein said plastic material substrate has an index of refraction of at least 1.6, and wherein said end index of refraction of said coating is at least approx. 1.5, said coating comprising a wear resistant hard material coating.

* * * * *